(12) United States Patent
Crowley et al.

(10) Patent No.: US 8,316,812 B2
(45) Date of Patent: Nov. 27, 2012

(54) DUAL OUTPUT FLOW CONTROL ACTUATOR

(75) Inventors: Allen G. Crowley, Sterling Heights, MI (US); Francis V. Rolland, Rochester Hills, MI (US); Thomas Kern, Rochester Hills, MI (US)

(73) Assignee: Mark IV Systemes Moteurs USA, Inc., Rochester Hills, MI (US)

( * ) Notice: Subject to any disclaimer, the term of this patent is extended or adjusted under 35 U.S.C. 154(b) by 668 days.

(21) Appl. No.: 12/206,959

(22) Filed: Sep. 9, 2008

(65) Prior Publication Data
US 2010/0059700 A1 Mar. 11, 2010

(51) Int. Cl.
*F02M 35/10* (2006.01)

(52) U.S. Cl. ............. 123/184.31; 123/336; 251/348; 251/249.5

(58) Field of Classification Search ............ 123/183.31, 123/336, 339.14, 339.15, 339.26; 251/214, 251/248, 249.5, 250, 129
See application file for complete search history.

(56) References Cited

U.S. PATENT DOCUMENTS

| | | | | |
|---|---|---|---|---|
| 2,349,157 A * | 5/1944 | Ford et al. | | 123/90.31 |
| 2,859,640 A * | 11/1958 | Geyer | | 74/625 |
| 3,981,624 A * | 9/1976 | Brandon | | 417/53 |
| 4,084,451 A * | 4/1978 | Ward | | 477/69 |
| 4,182,168 A * | 1/1980 | Desch | | 73/862.49 |
| 4,304,202 A * | 12/1981 | Schofield | | 123/363 |
| 4,471,733 A * | 9/1984 | Tangorra et al. | | 123/185.14 |
| 5,099,805 A * | 3/1992 | Ingalls | | 123/90.15 |
| 5,156,119 A * | 10/1992 | Suga | | 123/90.17 |
| 5,168,954 A | 12/1992 | Nakaniwa et al. | | |
| 5,385,062 A * | 1/1995 | Menke | | 74/54 |
| 5,687,691 A | 11/1997 | Kaiser et al. | | |
| 5,950,765 A * | 9/1999 | Pearson et al. | | 185/40 R |
| 5,983,937 A * | 11/1999 | Makihara et al. | | 137/624.15 |
| 6,032,625 A * | 3/2000 | Schwegler | | 123/90.17 |
| 6,125,819 A * | 10/2000 | Strieber et al. | | 123/316 |
| 6,276,664 B1 * | 8/2001 | Keller | | 251/129.12 |
| 6,439,104 B1 * | 8/2002 | Tonogai et al. | | 92/140 |
| 6,895,926 B1 | 5/2005 | Moreau et al. | | |
| 6,955,149 B1 | 10/2005 | Christie et al. | | |
| 7,011,066 B2 | 3/2006 | Ward et al. | | |
| 7,089,909 B2 | 8/2006 | Moschini et al. | | |
| 7,111,602 B2 | 9/2006 | Sturdy et al. | | |
| 7,140,151 B2 * | 11/2006 | Spaziani et al. | | 49/349 |
| 7,213,557 B2 * | 5/2007 | Kondo et al. | | 123/184.53 |
| 2001/0027146 A1 * | 10/2001 | Spaziani et al. | | 477/3 |
| 2006/0081208 A1 | 4/2006 | Sturdy et al. | | |
| 2006/0191736 A1 * | 8/2006 | Maeda et al. | | 180/444 |
| 2006/0272613 A1 | 12/2006 | Bellato et al. | | |
| 2007/0199541 A1 * | 8/2007 | Fukami et al. | | 123/399 |

* cited by examiner

*Primary Examiner* — Noah Kamen
*Assistant Examiner* — Long T Tran
(74) *Attorney, Agent, or Firm* — Thompson Hine L.L.P.

(57) ABSTRACT

Disclosed herein is an actuator for regulating the flow of fluids in first and second flow paths of an internal combustion engine. The actuator includes a motor having a rotatable drive shaft, a gear assembly driven by the drive shaft of the motor, and first and second output shafts rotated in opposite directions by the gear assembly. The first and second output shafts are operatively linked to valves in the first and second flow paths, respectively, to regulate the flow of fluids in the first and second flow paths.

27 Claims, 5 Drawing Sheets

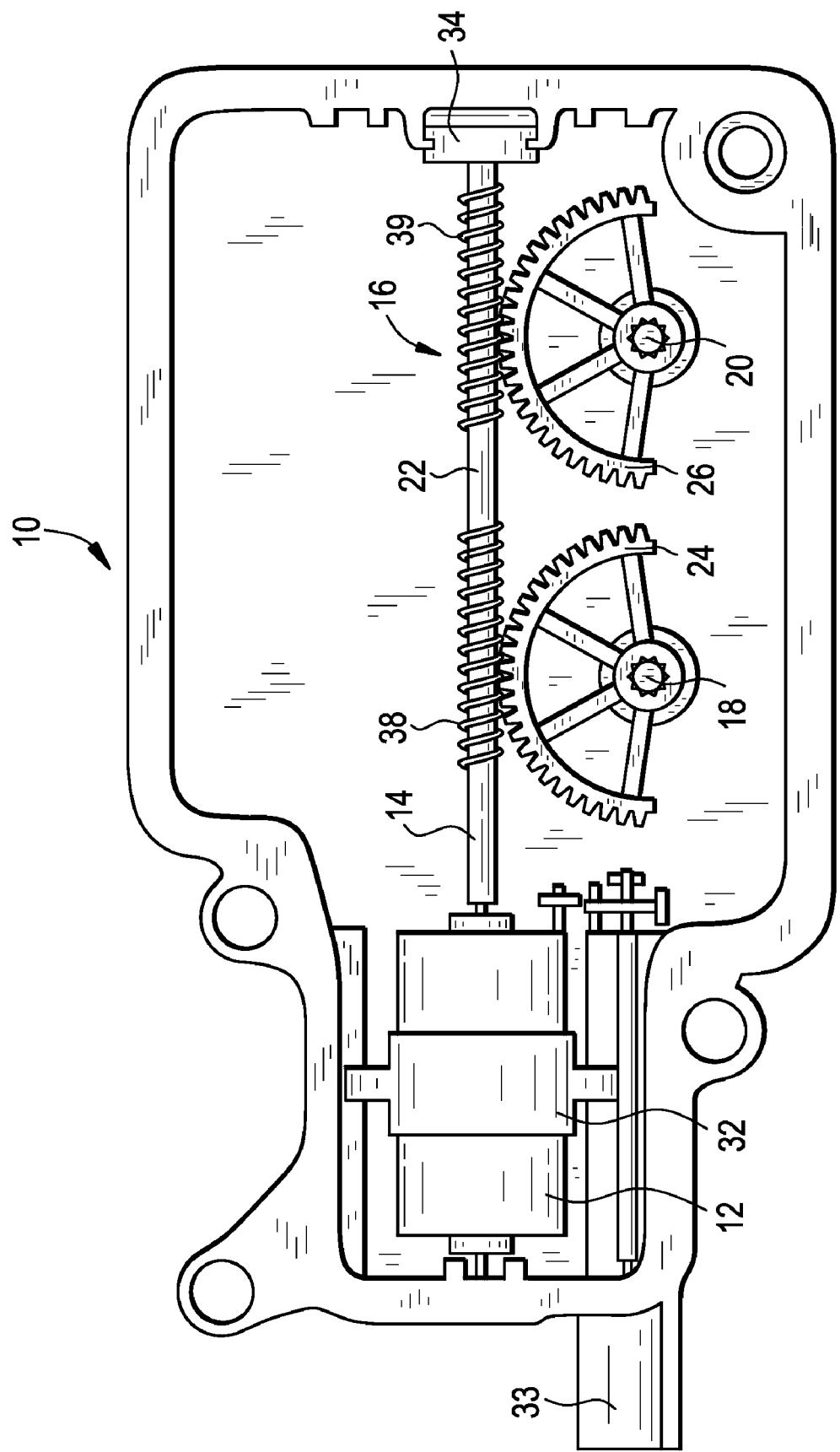

DUAL OUTPUT FLOW CONTROL ACTUATOR

BACKGROUND

The present application relates generally to an actuator for use in internal combustion engines.

Internal combustion engines require various control methods and associated hardware for performance, fuel economy and/or emission control. Some of these involve the control of fluids in multiple flow paths. Some of the multiple flow paths may be substantially parallel, such as the opposite banks of a multiple cylinder V-engine.

Actuators for regulating the fluids in a flow path have been vacuum or electronically driven, but with low resolution, low accuracy of adjustment, and with excess "play" in the linkages. In regulating two flow paths multiple actuators have been used, but synchronization of their operation is difficult. The actuator disclosed herein is a simplified actuator that improves reliability, ease of assembly and reduced cost, and has improved accuracy and repeatability in regulating fluid flow in multiple flow paths.

SUMMARY

In one aspect, disclosed herein is an actuator for regulating the flow of fluids in first and second flow paths of an internal combustion engine. The actuator includes a motor having a rotatable drive shaft, a gear assembly driven by the drive shaft of the motor, a first output shaft rotated by the gear assembly to regulate the flow of fluids in a first flow path, and a second output shaft rotated by the gear assembly to regulate the flow of fluids in a second flow path. The first output shaft and the second output shaft rotate in opposite directions.

In another aspect, disclosed herein is an intake manifold assembly with an actuator for regulating the flow of fluids in an internal combustion engine. The intake manifold assembly includes an intake manifold having a first flow path and a second flow path, and an actuator attached thereto. The actuator comprises a motor having a rotatable drive shaft, a gear assembly driven by the drive shaft of the motor, a first output shaft rotated by the gear assembly to regulate the flow of fluids in the first flow path, and a second output shaft rotated by the gear assembly to regulate the flow of fluids in the second flow path. The first output shaft and the second output shaft rotate in opposite directions.

BRIEF DESCRIPTION OF THE SEVERAL VIEWS OF THE DRAWINGS

FIG. 2 shows a perspective view of an actuator according to another embodiment with the cover removed;

DETAILED DESCRIPTION

The following detailed description is intended to be representative only and not limiting as to the design and placement of components with an actuator. Many variations can be devised by one skilled in the art, that is, to those who have knowledge or experience in this area of technology. Such variations are included within the scope of the present invention. The following discussion of embodiments of the actuator will illustrate the general principles of the invention, examples of which are additionally illustrated in the accompanying drawings.

The term "fluid" as used herein means any phase of matter capable of flowing, i.e., liquids, gases, suspensions, colloids, etc.

The dual output actuators disclosed herein incorporate two rotary shaft outputs. Having two rotary shaft outputs is advantageous in that the shafts may be spaced on a custom basis to exactly match the configuration of the flow systems and paths of interest. Additionally, as disclosed herein, the rotary outputs are mainly contained within a sealed unit as well as their connection to the gears and a motor that drives the gears, which provides the advantage of protecting the rotary outputs, gears, etc. from external damage, debris, contaminants, snow, water, ice, and the like. Various configurations of the gears, as disclosed herein, make it possible to advantageously control the linkages connecting the rotary shaft outputs to the flow system control means, such as a valve, for example, of an intake manifold, to precisely open and close the flow system for fluid communication with other engine parts, such as a lower intake manifold or the cylinders of an internal combustion engine.

Figure 1A:
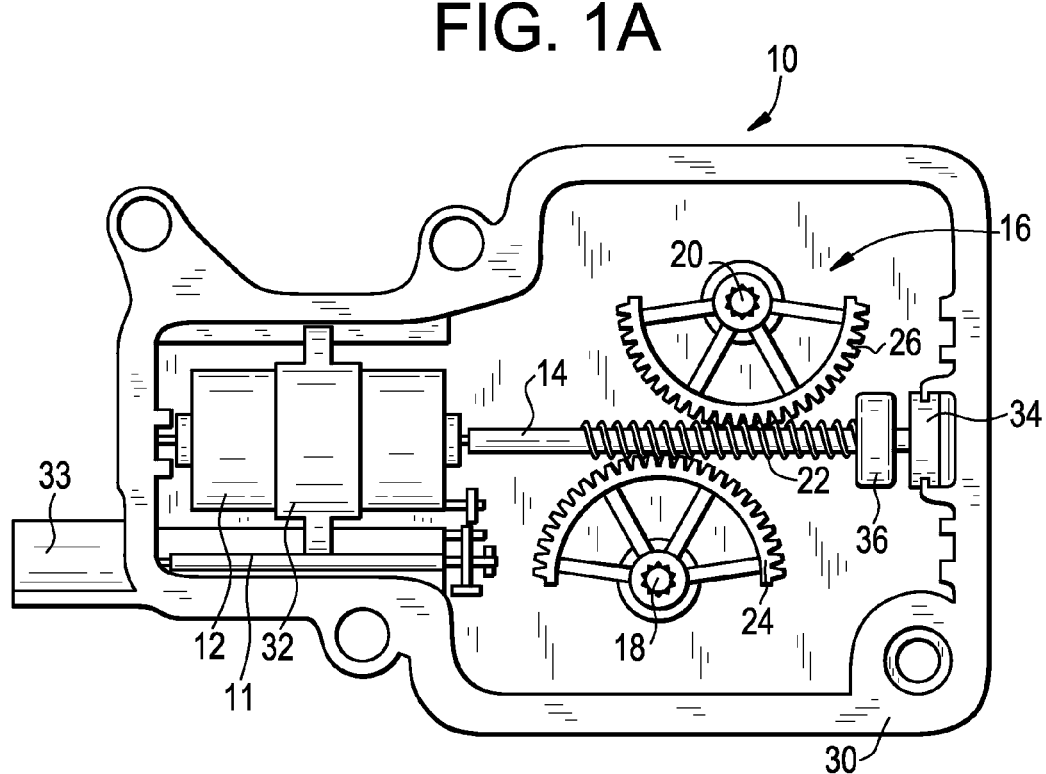
FIG. 1A shows a perspective view of an actuator according to one embodiment with the cover removed.
Figure 1B:
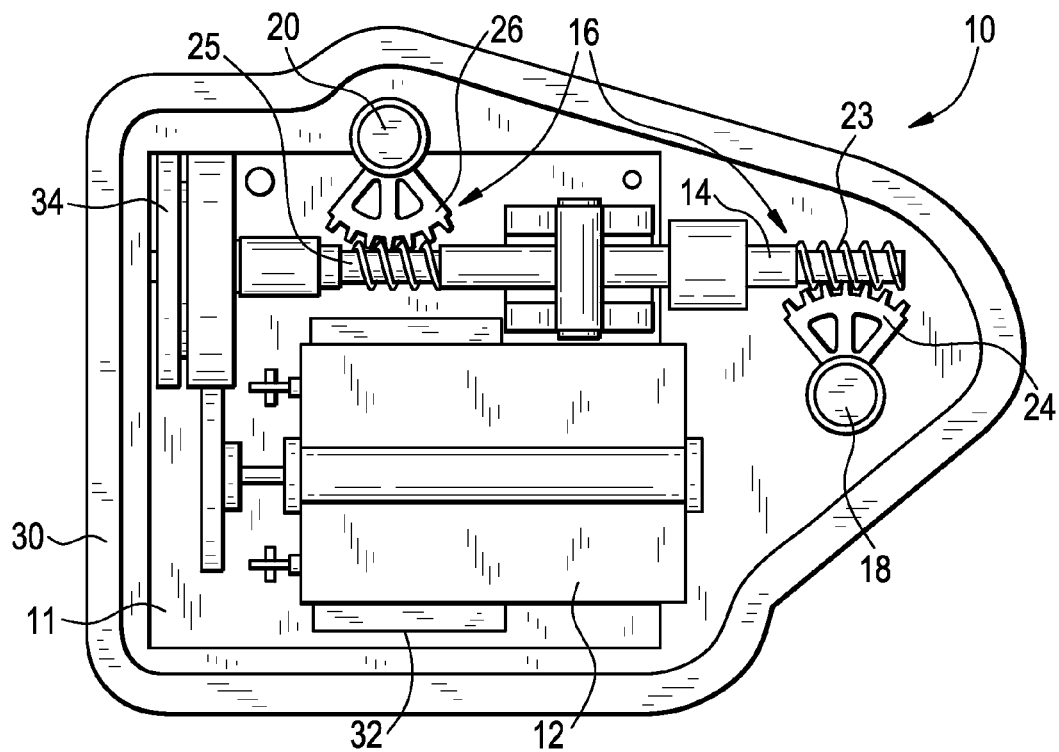
FIG. 1B shows a perspective view of an actuator according to another embodiment with the cover removed.

Referring to FIGS. 1A and 1B, an actuator 10 according to a first embodiment shown in FIG. 1A and a second embodiment shown in FIG. 1B is provided for regulating the flow of fluids in a first flow path and a second flow path of an internal combustion engine. The actuator 10 includes a motor 12 having a rotatable drive shaft 14, a gear assembly 16 that is driven by the drive shaft 14, a first output shaft 18, and a second output shaft 20. The first output shaft 18 and the second output shaft 20 are rotated by the gear assembly 16 in opposite directions to regulate the flow of fluids in the first and second flow paths, respectively. As described in more detail below, fluid flow may be regulated using a first valve operatively linked to the first output shaft 18 and a second valve operatively linked to the second output shaft 20.

The first and second valves may be part of the internal combustion engine. In one embodiment the first valve may regulate a primary intake air flow and the second valve may regulate a secondary flow, such as idle bypass air, positive crankshaft ventilation scavenged mixture, purge vapor, or exhaust gas recirculation gases. In another embodiment, the first and second valves may be part of an intake manifold. In particular, the first and second valves may be in opposite banks of the intake manifold, and may be in substantially parallel flow paths.

The actuator 10 may include a control circuit 11 that operates the motor 12, a base 30, a retaining clip 32, a plug 33, a bearing 34, and a magnet 36. The retaining clip 32 allows the drive shaft 14 and bearing 34 interface to correctly align with the motor, and gear assembly for reduced radial runout, which reduces the potential for excess friction and wear. The bearing 34 may be a thrust bearing. The thrust bearing may be a bidirectional bearing, and further may be a low-friction bearing. The drive shaft 14 may have a collar near the end farthest from the motor 12. The collar may engage the bearing 34 for low-friction rotations of the drive shaft 14.

In FIG. 1A, gear assembly 16 includes a worm gear 22, which is rotated by the drive shaft 14 of the motor 12. The worm gears 22 may be part of the drive shaft 14, mounted thereon, or may be separately connected to the drive shaft 14.

In FIG. 1A, the gear assembly 16 further includes a first driven gear 24 and a second driven gear 26 engaged with the worm gear 22. The first driven gear 24 and the second driven gear 26 may engage the worm gear on opposing sides of the worm gear 22 such that the first and second driven gears rotate in opposite directions when driven by the worm gear. Additionally, the first driven gear 24 and the second driven gear 26 may be aligned or off-set on opposing sides of the worm gear 22. The first driven gear 24 may be coupled to the first output shaft 18 by, for example, a splined connection to rotate the first output shaft 18 therewith. The second output shaft 20, likewise, may be coupled to the second driven gear 26 for rotation therewith. It is understood that the driven gears 24, 26 may be engaged or coupled to the output shafts by a variety of means including the use of intervening pinion gears.

In FIG. 1B, gear assembly 16 includes a first worm gear 23 and a second worm gear 25, which are rotated by the drive shaft 14 of the motor 12. The worm gears 23, 25 may be part of the drive shaft 14, mounted thereon, or may be separately connected to the drive shaft 14. In FIG. 1B, the gear assembly 16 further includes a first driven gear 24 engaged with the first worm gear 23 and a second driven gear 26 engaged with the second worm gear 25. The first driven gear 24 and the second driven gear 26 may engage the worm gear on opposing sides of the worm gear 22 such that the first and second driven gears rotate in opposite directions when driven by the worm gear. The first driven gear 24 may be coupled to the first output shaft 18 by, for example, a splined connection to rotate the first output shaft 18 therewith. The second output shaft 20, likewise, may be coupled to the second driven gear 26 for rotation therewith. It is understood that the driven gears 24, 26 may be engaged or coupled to the output shafts by a variety of means including the use of intervening pinion gears. It should be understood that the embodiments shown should not be construed to limited the connection between the driven gears and the output shafts to a splined connection as shown in FIGS. 1A and 1B and that this disclosure is broad enough to include other means of engagement or connection.

In another embodiment, illustrated in FIG. 2, gear assembly 16 includes a worm gear 22 with a right-handed section 38 and a left-handed section 39. The right-handed section 38 and the left-handed section 39 may be formed together or separately. The gear assembly 16 further includes a first driven gear 24 that engages the right-handed section 38 of the worm gear and a second driven gear 26 that engages the left-handed section 39 of the worm gear. In this embodiment, the first and second output shafts 18, 20 may be positioned on the same side of the actuator's drive shaft 14 yet still be driven in opposite directions by the gear assembly 16.

Figure 3:
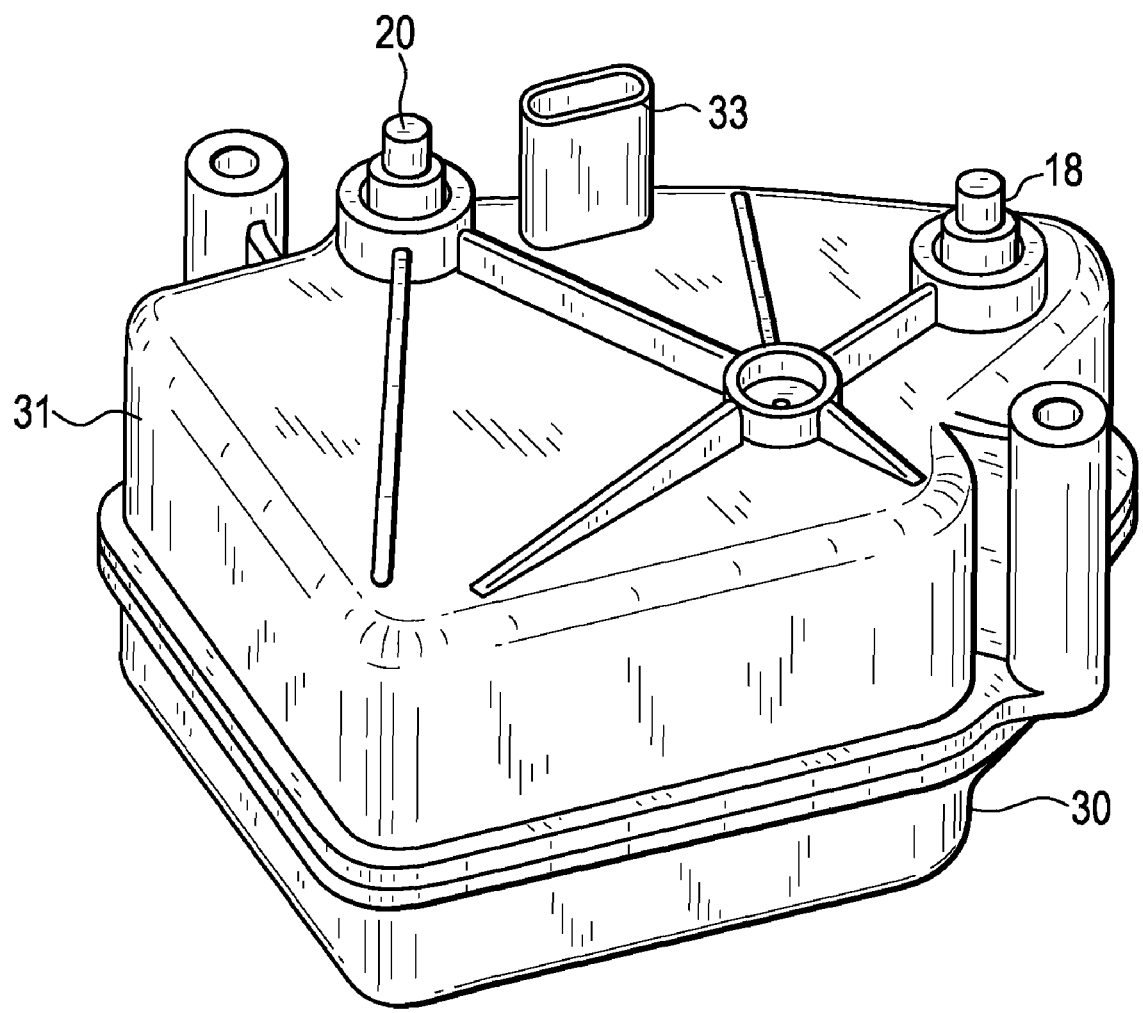
FIG. 3 shows a perspective view of an actuator with the cover in place.

Referring to FIG. 3, various embodiments of the actuator 10 may include a base 30 and a cover 31. The base 30 and cover 31 may be manufactured using known methods and materials. For example, the base 30 and cover 31 may be molded from a polymer impregnated with nylon or die-cast in aluminum or steel. In one embodiment, at least a portion of the base 30 and/or cover 31 may be metallic and may be utilized as a heat sink. The base 30 and cover 31 protect the components of the actuator housed therein from any external damage, debris, contaminants, snow, ice, and the like. In one embodiment, as shown in FIG. 3, the first output shaft 18 and the second output shaft 20 extend through the cover 31. The first output shaft 18 and the second output shaft 20 may then have a first linkage and a second linkage respectively attached thereto to regulate the flow of fluids in a first flow path and a second flow path of an internal combustion engine. The cover 31, as shown in the embodiment illustrated in FIG. 3, includes a plug for connecting the actuator to other portions of the engine, e.g., an intake manifold.

Figure 4A:
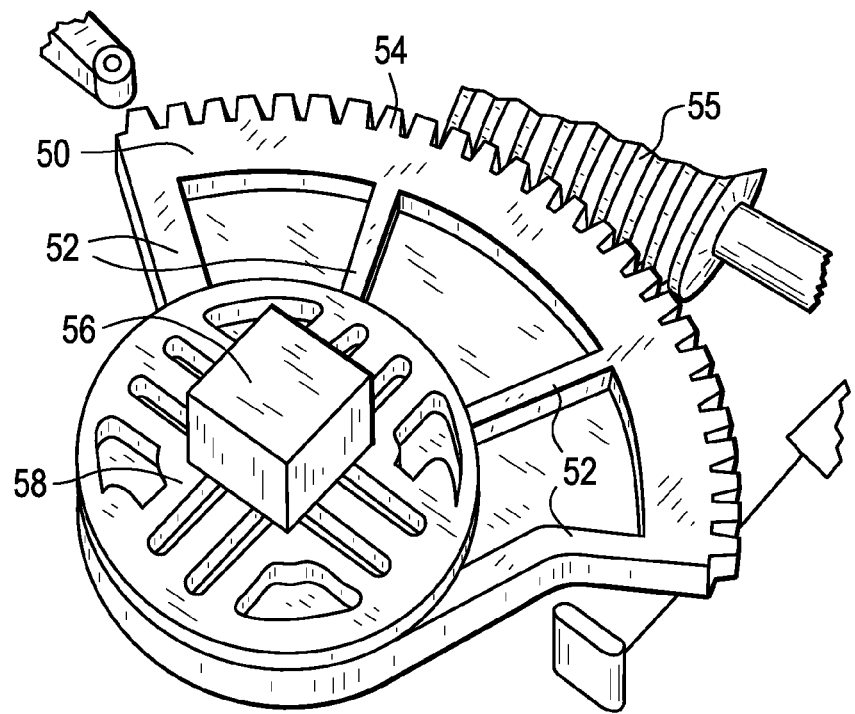
FIGS. 4A and 4B show driven gears according to two embodiments.
Figure 4B:
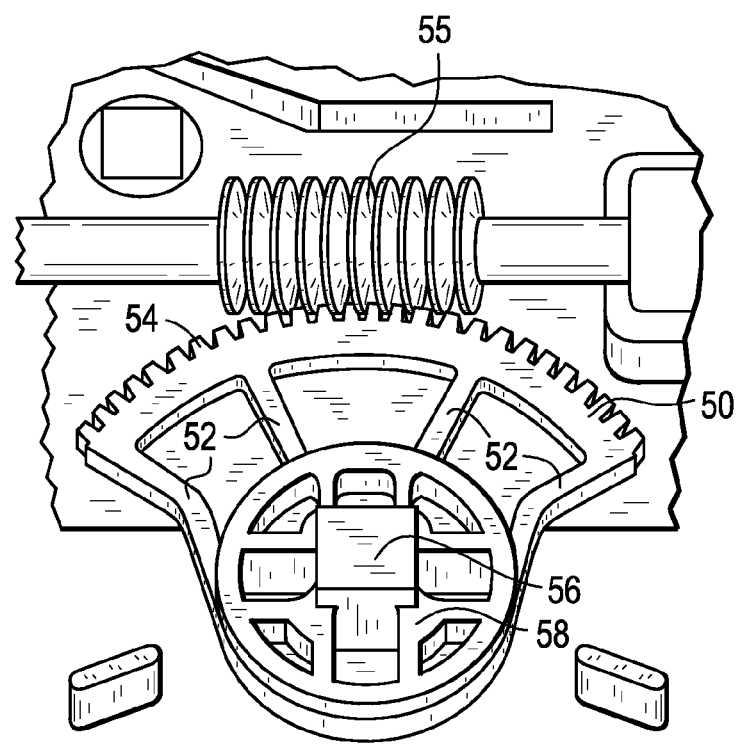

Referring now to FIGS. 4A and 4B, a shock absorbing gear 50, may be used as the driven gear including driven gears 24 and 26 of the previously described embodiments. The shock absorbing features of the driven gear 50 may be regulated by varying the geometry of the driven gear. For example, the length, width, and depth of the supporting members 52 may be varied, as well as the number of supporting members 52 present in any single driven gear 50. The material of the driven gear 50 may also be selected to regulate the shock absorbing function. The driven gear 50 may also include shock absorbing material between adjacent supporting members 52, as shown in FIGS. 4A and 4B.

The driven gear 50 includes teeth 54 arranged for meshed engagement with the teeth of another gear, for example, a worm gear. The driven gear 50 also includes a receiving portion 58 that includes an opening shaped to receive a portion of an output shaft 56 including the first or second output shafts 18, 20 of the previously described embodiments. The portion of the output shaft 56 to be received by the driven gear 50 may be shaped such that the output shaft 56 will turn with the driven gear 50 without slipping rotationally and without slipping axially out of the driven gear 50. In one embodiment, the portion of the output shaft 56 to be received by the driven gear 50 may be knurled. In another embodiment, the portion of the output shaft 56 to be received by the driven gear may have two sets of parallel sides such that the corners of the output shaft 56 fit tightly into the receiving portion 58 of the driven gear 50.

Figure 5:
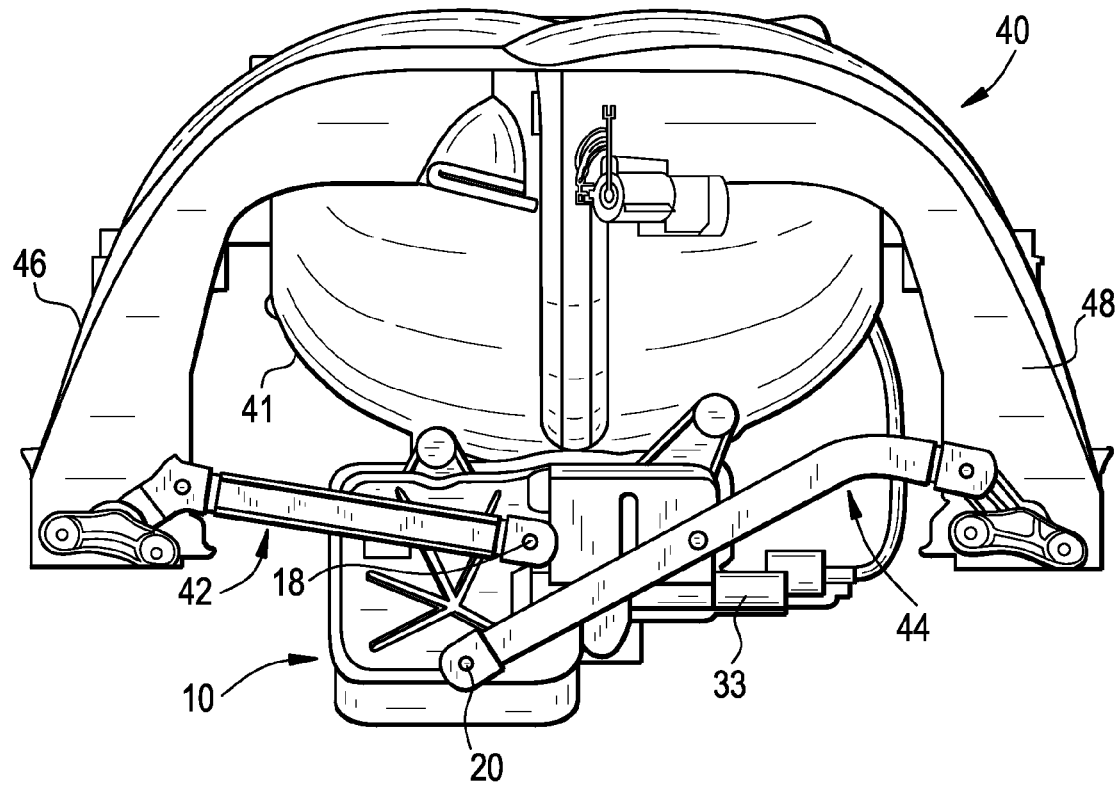
FIG. 5 is a perspective view of an intake manifold assembly including an actuator.

Referring now to FIG. 5, according to another aspect of the invention, the first output shaft 18 is operatively coupled to a first valve by a first linkage 42. The linkage may be any mechanical linkage or combination of mechanical linkages that is capable of opening and/or closing a valve, or controlling the valve to open it to any selected degree between the fully open position and the closed position. In the embodiment illustrated in FIG. 5, the linkage is a plurality of interconnected levers and/or arms. Other suitable linkages are known in the art and may be utilized. For example, U.S. Pat. No. 7,011,066 teaches a control shaft linked to a valve shaft control arm by a pin that actuates a valve. Another possible linkage includes a cam and follower. The second output shaft 20 may likewise be operatively coupled to a second valve by a second linkage 44.

In one embodiment, the gear assembly 16 and linkages 42, 44 are designed so that the first valve and the second valve are actuated at the same time and are moved to the same degree. In another embodiment, the gear assembly 16 and linkages 42, 44 are designed so that the first and second valves are actuated at the same time and are moved proportionally to differing degrees. This embodiment may be appropriate for a multiple staged intake manifold, or a system having a dual or multiple staged intake manifold coupled with a secondary system, such as a charge motion control valve(s). In yet another embodiment, the gear assembly 16 and linkages 42, 44 are designed so that the first and second valves are actuated at different times, i.e., the valves have staggered actuation. Even in the case of staggered actuation, however, the gear assembly 16 and linkages 42, 44 may further be designed so that the first and second valves simultaneously reach their fully open position.

FIG. 5 illustrates an intake manifold assembly 40 according to one embodiment of the invention. The intake manifold assembly 40 includes an intake manifold 41 having a first flow path 46, a second flow path 48, and an actuator 10 for regulating the flow of fluids in the first and second flow paths 46, 48. The actuator 10 may be an integral component of the intake manifold 41 or may be attached to the intake manifold 41 by any suitable means. For example, the actuator 10 may be bolted, screwed, or the like, or welded to the intake manifold 41 using vibration, ultrasonic, or other types of welding known in the art. In one embodiment, the first and second flow paths 46, 48 are located in opposite banks or sides of the manifold 41.

It will be appreciated that an actuator in accordance with the present invention may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such an actuator without departing from the scope or spirit of the present invention, and that the claims are not limited to the preferred embodiments illustrated.

What is claimed is:

1. An actuator for regulating the flow of fluids in a first flow path and a second flow path of an internal combustion engine, the actuator comprising:
   a motor having a rotatable drive shaft;
   at least two gear assemblies driven by the drive shaft of the motor as divergent gear pathways;
   a first output shaft connected to one of the gear assemblies for rotation therewith to regulate the flow of fluids in the first flow path; and
   a second output shaft connected to the second gear assembly for rotation therewith to regulate the flow of fluids in the second flow path;
   wherein the first output shaft and the second output shaft rotate in opposite directions while simultaneously regulating the flow of fluids in their respective first flow path and second flow path.

2. The actuator of claim 1 wherein the first output shaft is operatively coupled to a first valve in the first flow path by a first linkage such that rotation of the first output shaft causes actuation of the first valve to regulate the flow of fluid.

3. The actuator of claim 2 wherein the first valve is part of an intake manifold.

4. The actuator of claim 2 wherein the second output shaft is operatively coupled to the second valve by a second linkage and the rotation of the second output shaft causes actuation of a second valve in the second flow path to regulate the flow of fluid.

5. The actuator of claim 4 wherein the first linkage actuates the first valve and the second linkage actuates the second valve to the same degree of actuation.

6. The actuator of claim 5 wherein the actuation of the first valve and the second valve are initiated at different times.

7. The actuator of claim 4 wherein the first linkage actuates the first valve and the second linkage actuates the second valve proportionally to differing degrees of actuation.

8. The actuator of claim 1 wherein the drive shaft includes or drives a worm gear operatively coupled to the two gear assemblies.

9. The actuator of claim 8 wherein both gear assemblies include a driven gear directly engaged with the worm gear.

10. The actuator of claim 9 wherein the worm gear includes a right-handed section and a left-handed section.

11. The actuator of claim 10 wherein the driven gear of one of the gear assemblies is engaged with the right-handed section of the worm gear and the driven gear of the second gear assembly is engaged with the left-handed section.

12. The actuator of claim 1 wherein the first flow path and the second flow path are in opposite banks of an intake manifold.

13. The actuator of claim 1 wherein the actuator is a component of an intake manifold.

14. An intake manifold assembly with an actuator for regulating the flow of fluids in a first flow path and a second flow path of an internal combustion engine, the assembly comprising:
   an intake manifold having the first flow path and the second flow path; and
   an actuator as a component of the intake manifold, the actuator comprising:
   a motor having a rotatable drive shaft;
   a gear assembly driven by the drive shaft of the motor, the gear assembly comprising a worm gear driven by the drive shaft and a first gear and a second gear driven by the worm gear, wherein the first gear and the second gear form divergent gear assemblies;
   a first output shaft rotated by the first gear to regulate the flow of fluids in the first flow path; and
   a second output shaft rotated by the second gear to regulate the flow of fluids in the second flow path;
   wherein the first output shaft and the second output shaft rotate in opposite directions.

15. The actuator of claim 14 wherein the first output shaft is operatively coupled to a first valve in the first flow path by a first linkage such that rotation of the first output shaft causes actuation of the first valve to regulate the flow of fluid.

16. The actuator of claim 15 wherein the second output shaft is operatively coupled to the second valve by a second linkage and the rotation of the second output shaft causes actuation of a second valve in the second flow path to regulate the flow of fluid.

17. The actuator of claim 16 wherein the first linkage actuates the first valve and the second linkage actuates the second valve to the same degree of actuation.

18. The actuator of claim 17 wherein the actuation of the first valve and the second valve are initiated at different times.

19. The actuator of claim 16 wherein the first linkage actuates the first valve and the second linkage actuates the second valve proportionally to differing degrees of actuation.

20. The actuator of claim 14 wherein the first flow path and the second flow path are in opposite banks of an intake manifold.

21. The actuator of claim 14 wherein the first driven gear and the second driven gear engage the worm gear on opposing sides of the worm gear.

22. The actuator of claim 14 wherein the worm gear includes a right-handed section and a left-handed section.

23. The actuator of claim 22 wherein the first driven gear is engaged with the right-handed section of the worm gear and the second driven gear is engaged with the left-handed section.

24. An actuator for regulating the flow of fluids in a first flow path and a second flow path of an internal combustion engine, the actuator comprising:

a housing having enclosed therein a motor having a rotatable drive shaft and a first gear and a second gear driven by the drive shaft;

a first output shaft extending through the housing into an operative connection to the first gear for rotation thereby; and a second output shaft extending through the housing into an operative connection to the second gear for rotation thereby;

wherein the first gear and second gear are divergent gear assemblies, and the first output shaft and the second output shaft rotate simultaneously to regulate the flow of fluids in a first flow path and a second flow path, respectively.

25. The actuator of claim 24 wherein the first output shaft is operatively coupled to a first valve in the first flow path by a first linkage such that rotation of the first output shaft causes actuation of the first valve, and the second output shaft is operatively coupled to a second valve by a second linkage such that rotation of the second output shaft causes actuation of the second valve.

26. The actuator of claim 25 wherein the first linkage actuates the first valve and the second linkage actuates the second valve to the same degree of actuation.

27. The actuator of claim 25 wherein the first linkage actuates the first valve and the second linkage actuates the second valve proportionally to differing degrees of actuation.

* * * * *